(12) United States Patent
Nyflött et al.

(10) Patent No.: US 11,247,443 B2
(45) Date of Patent: Feb. 15, 2022

(54) RE-PULPABLE PACKAGING MATERIAL

(71) Applicant: Stora Enso OYJ, Helsinki (FI)

(72) Inventors: Åsa Nyflött, Karlstad (SE); Chris Bonnerup, Floda (SE); Magnus Ekberg, Fors (SE)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 17/251,363

(22) PCT Filed: Jun. 12, 2019

(86) PCT No.: PCT/IB2019/054893
§ 371 (c)(1),
(2) Date: Dec. 11, 2020

(87) PCT Pub. No.: WO2019/239334
PCT Pub. Date: Dec. 19, 2019

(65) Prior Publication Data
US 2021/0245481 A1    Aug. 12, 2021

(30) Foreign Application Priority Data
Jun. 12, 2018 (SE) .................................... 1850719-4

(51) Int. Cl.
*B32B 27/10* (2006.01)
*B32B 27/32* (2006.01)
(Continued)

(52) U.S. Cl.
CPC .............. *B32B 27/10* (2013.01); *B32B 27/32* (2013.01); *B65D 65/38* (2013.01); *B32B 29/005* (2013.01);
(Continued)

(58) Field of Classification Search
CPC ..... B32B 27/10; B32B 27/32; B32B 2255/12; B32B 2255/26; B32B 2307/718;
(Continued)

(56) References Cited

U.S. PATENT DOCUMENTS 4,802,943 A    2/1989 Gibbons et al.
5,587,204 A    12/1996 Kinsey, Jr. et al.
(Continued)

FOREIGN PATENT DOCUMENTS

EP    0085919 A1    8/1983
EP    2777934 A1    9/2014
(Continued)

OTHER PUBLICATIONS

International Search Report from corresponding PCT Application No. PCT/IB2019/054893 dated Sep. 27, 2019.

*Primary Examiner* — Yan Lan
(74) *Attorney, Agent, or Firm* — Greer, Burns & Crain, Ltd.

(57) ABSTRACT

The invention relates to a packaging material comprising: a paperboard substrate comprising a first and a second side, at least one barrier layer applied on the first side of the substrate, the barrier layer comprising a water-soluble polymer selected from the group of polyvinyl alcohol, a copolymer of ethylene and polyvinyl alcohol, starch, carboxymethylcellulose and combinations thereof in an amount of at least 50 weight %, based on the dry weight of the barrier layer, an extrusion coated layer of a polyolefin on the barrier layer, and at least one dispersion barrier layer applied on the second side of the substrate, which at least one dispersion barrier layer forms a printing surface of the packaging material. The invention further relates to a method of manufacturing a respective packaging material.

15 Claims, 1 Drawing Sheet

(51) Int. Cl.
*B65D 65/38* (2006.01)
*B32B 29/00* (2006.01)
*D21H 19/52* (2006.01)
*D21H 19/54* (2006.01)

(52) U.S. Cl.
CPC ....... *B32B 2255/12* (2013.01); *B32B 2255/26* (2013.01); *B32B 2307/718* (2013.01); *B32B 2307/7244* (2013.01); *B32B 2307/7246* (2013.01); *D21H 19/52* (2013.01); *D21H 19/54* (2013.01)

(58) Field of Classification Search
CPC .... B32B 2307/7244; B32B 2307/7246; B32B 2307/7265; B32B 2307/75; B32B 2439/70; B32B 29/005; B32B 29/00; B32B 9/06; B65D 65/38; B65D 2565/385; D21H 19/54; D21H 19/22; D21H 19/32; D21H 19/52; D21H 19/82; D21H 19/84
See application file for complete search history.

(56) References Cited

U.S. PATENT DOCUMENTS

| | | | |
|---|---|---|---|
| 5,897,411 | A | 4/1999 | Stark et al. |
| 6,692,801 | B1* | 2/2004 | Berlin .................... B32B 27/10 428/34.2 |
| 2001/0005550 | A1 | 6/2001 | Bengtsson et al. |
| 2011/0046284 | A1 | 2/2011 | Berube et al. |
| 2019/0352854 | A1* | 11/2019 | Backfolk ............... D21H 19/22 |

FOREIGN PATENT DOCUMENTS

| | | |
|---|---|---|
| SE | 440519 B | 8/1985 |
| WO | 9716312 | 5/1997 |
| WO | 9958331 | 11/1999 |
| WO | 2004074574 A2 | 9/2004 |
| WO | 2010114467 A1 | 10/2010 |
| WO | 2011003565 A2 | 1/2011 |
| WO | 2012093036 A1 | 7/2012 |

* cited by examiner

RE-PULPABLE PACKAGING MATERIAL

This application is a U.S. National Phase under 35 U.S.C. § 371 of International Application No. PCT/IB2019/054893 filed Jun. 12, 2019, which claims priority under 35 U.S.C. §§ 119 and 365 to Swedish Application No. 1850719-4, filed Jun. 12, 2018.

The present invention relates to packaging material for liquids or frozen food, and particularly to a re-pulpable packaging material.

Fiber based material used in packages or cups for liquids or frozen food is usually provided with barrier coatings both on the inside (facing the packed item) and on the outside (print-side). The barrier coating applied on the inside makes the material resistant against e.g. liquids, grease, oxygen and/or aroma and enables it to withstand the influence of the packed item on the packing material. The barrier coating should also be heat-sealable. The most commonly used materials when forming a barrier on a fiber based product are polyolefins, such as polyethylene (PE) or polypropylene (PP). Today, also bio-based versions thereof are used including other bio-based polymers such as polylactic acid (PLA). Liquid packaging board is usually provided with polymer coating on both sides and oftentimes with an additional laminated aluminum layer on the inside.

WO 2011/003565 A2 and WO 2012/093036 A2 disclose a non-foil packaging laminate for liquid food packaging comprising a layer of paper or other cellulose-based material, outermost liquid tight, heat sealable layers of polyolefin-based polymers and an induction heat susceptible metal coating that is vapour-deposition coated onto the inner side of the layer of paper or cellulose-based material. The metal vapour-deposition coated layer may be a layer substantially consisting of aluminum. The packaging laminate thus includes a metal layer, particularly an aluminum layer. US 2001/0005550 A1 discloses a method of producing a laminated packaging material including a core layer of paper or paperboard and a barrier layer applied on one side of the core layer and a laminated packaging material produced accordingly. Preferably, starch or a starch derivative is used as a barrier layer. The laminate however is multi-layered with thermoplastic outer layers.

Packaging materials including several layers of polyolefins and aluminum foil are hard to re-pulp due to problems in separating the plastic coating from the paperboard. There remains a need for a packaging material that is both repulpable, but still provides barrier against oxygen and moisture.

This object is met with the packaging material, the method of manufacturing the packaging material, and the packaging according to the independent claims of the present invention. The dependent claims are related to preferred embodiments. They may be combined freely unless the context clearly indicates otherwise.

The invention provides a packaging material comprising:
a paperboard substrate comprising a first and a second side,
at least one barrier layer applied on the first side of the substrate, the barrier layer comprising a water-soluble polymer selected from the group of polyvinyl alcohol (PVOH), a copolymer of ethylene and polyvinyl alcohol, starch, carboxymethylcellulose (CMC) and combinations thereof in an amount of at least 50 weight %, based on the dry weight of the barrier layer,
an extrusion coated layer of a polyolefin on the barrier layer, and
at least one dispersion barrier layer applied on the second side of the substrate, which at least one dispersion barrier layer forms a printing surface of the packaging material.

It has surprisingly been found that the packaging material according to the invention is easily re-pulpable and still provides a good moisture and oxygen barrier.

The extrusion coated layer of the polyolefin applied on the barrier layer is thus in direct contact with the barrier layer. It has been shown that by arranging a barrier layer of a water-soluble polymer of PVOH, a copolymer of ethylene and PVOH, starch or CMC in direct contact with an extruded polyolefin layer, the oxygen and moisture barrier properties are surprisingly high, particularly higher than expected considering the properties of the respective single layers. This provides that no extra layer of e.g. aluminum is needed. As used herein, a water-soluble polymer refers to a polymer that dissolves, disperses, or swells in water. Such a polymer thus is usable for water-based polymer emulsions. Without wishing to be bound to any theory, it is assumed that this might be due to the fact that a trans-crystalline structure may be formed at the interface between the polyolefin layer and the water-soluble polymer layer.

In addition, the arrangement of a barrier layer of a water-based polymer such as PVOH, starch, or CMC between the paperboard substrate and the extrusion coated layer of the polyolefin highly facilitates the re-pulpability of the packaging material and facilitates the separation of the polyolefin layer in the recycling. Preferably, the packaging material does only include one polyolefin layer. Particularly, the packaging material does not include a polyolefin layer on the second side of the substrate, being the outside/print side of a packaging. Since the amount of extruded polyolefin can be considerably diminished compared to known packaging laminates, correspondingly the reject levels can be diminished markedly. In embodiments, the reject in the repulping of the packaging material or a packaging made thereof is less than 15 weight %, preferably less than 8 weight % more preferably less than 5 weight %, based on a dry weight of 100 weight % of the packaging or packaging material.

On the print side, the paperboard substrate is provided with a dispersion barrier layer to provide a barrier against moisture arising from condensation. The dispersion barrier layer may comprise latex and optionally pigments. Alternatively, the dispersion barrier layer may comprise starch and hydrophobic polymers such as wax, styrene maleic anhydride (SMA) and/or or an alkyl ketene dimer (AKD) or a copolymer of ethylene and PVOH further including optionally hydrophobic polymers. Such a dispersion coating applied on the outside/print side may serve as a sufficiently efficient barrier against moisture arising from condensation. In addition, the barrier layer provides good optical properties resulting in a surface of a thereof formed packaging suitable for printing.

While the dispersion barrier forms the print side, the extrusion coated layer forms the inside of a thereof formed packaging. Preferably, the extrusion coated layer is in direct contact with the content of the package. Preferably, the packaging material does not include further layers. In preferred embodiments, the packaging material does not include a layer of aluminum.

As used herein, "paperboard" refers to a paper based substrate of an amalgamation of fibers that can include, at least in part, vegetable, wood, and/or synthetic fibers. The paperboard substrate preferably comprises cellulosic fibers. A typical paperboard substrate used for packaging material comprises at least one ply, preferably several plies. The paperboard substrate is preferably a multilayer paperboard, comprising at least two layers of a back ply and a top ply. The paperboard substrate may further comprise one or several middle plies. The paperboard substrate for example may comprise a top and a back ply and a middle ply. The paperboard substrate may have a basis weight of at least 150 gsm, preferably at least 180 gsm, or at least 200 gsm, or at least 250 gsm. Such a multilayer paperboard is particularly suitable for packaging liquids and/or frozen food.

The grammage of a paper layer or coating layer refers to the weight expressed as grams per square meter, gsm or g/m². As used herein, gsm and g/m² may be used interchangeable.

As used herein, "barrier layer" refers to a coating layer providing barrier properties to the paperboard substrate by reducing or eliminating the permeability of gases such as oxygen through the material and/or the absorption of liquids in the fiber structure. Barrier coatings are required to prevent the egress of packaged products such as liquids or frozen foods, and to prevent the ingress into the package of oxygen, moisture, grease, oil and other contaminants that might deteriorate the quality of the packaged product.

As used herein, "dispersion barrier layer" refers to a layer that has been brought by dispersion coating onto the paperboard substrate, which is well known in the prior art of coating of aqueous solutions and dispersions. As used herein, "dispersion coating" refers to a coating technique in which an aqueous dispersion comprising fine polymer particles, such as latex, is applied to the surface to form a solid, substantially non-porous film after drying.

As used herein, "laminate" refers to a material of multiple layers, which composite material achieves improved properties from the use of differing materials. The laminate is a multiple layer object assembled by e. g. heat, pressure or adhesives. The layered packaging material may be denoted a laminate.

As used herein, "latex" refers to an aqueous suspension of polymer particles, which can be natural polymers, synthetic polymers, synthetic polymers derived from biomass, or combinations thereof.

As used herein, "pigment" refers to extenders, fillers and coatings such as clay, chalk or kaolin used for papermaking as usually referred to in the paper industry.

In this context, a "printing surface" is meant to define a surface adapted to be printed. Thus the at least one dispersion barrier layer forming a printing surface forms the outermost layer of the paperboard.

The oxygen transfer rate (OTR) as expressed herein is measured in accordance with ASTM D3985, at a temperature of 23° C. and at 50% relative humidity (RH). The Water Vapor Transfer Rate as expressed herein is measured in accordance with ASTM F1249 with Mocon instrument at a temperature of 23° C. and at 50% RH. The water absorption rate expressed herein is measured using COBB 1800 in accordance with SCAN-P 12:64.

If not specifically denoted otherwise, given % are weight %, and are calculated on the basis of a dry weight of 100 weight % of the respective object, such as a layer, ply or packaging.

The present invention will be further described in connection with various embodiments and other aspects. They may be combined freely unless the context clearly indicates otherwise.

The paperboard substrate is preferably a multi-layer paperboard, comprising a top ply and a back ply and one or several middle plies, which middle plies provide bulk. The paperboard substrate, particularly the one or more middle plies can contain sulphate/kraft pulp and CTMP, which advantageously provide bulk. The pulp can be unbleached or bleached. The ply providing bulk may comprise at least 70 weight % of fibers originating from chemi-thermomechanical pulp (CTMP) or thermomechanical pulp (TMP) and/or may be foam formed. The substrate may have a basis weight of at least 150 gsm, or at least 200 gsm. On the top ply a mineral coating can be applied. Preferably, the top ply is without a mineral coating. The top ply and/or the back ply of the substrate may be untreated or surface sized, for example with a thin layer of starch, on one or both sides. The substrate preferably may be surface sized on the second side on which the dispersion barrier is applied. Surface sizing is applied prior to the application of the dispersion barrier layer or layers. The surface sizing may comprise or consist of modified starches or comprise surface sizing agents such as acrylic co-polymers. This further enhances the barrier properties of the dispersion coating.

The polyolefin of the extrusion coated layer may be a thermoplastic polyolefin, such as polyethylene (PE), polypropylene (PP), polymethylpentene (PMP), or mixtures thereof. In preferred embodiments, the polyolefin of the extrusion coated layer is selected from the group of polyethylene and polypropylene. These provide particularly good barrier properties and allow good application by extrusion coating. Such a barrier layer also is heat-sealable.

Between the extrusion coated polyolefin layer and the paperboard substrate, a barrier layer is arranged. The barrier layer comprises at least 50 weight % of a water-soluble polymer selected from the group of PVOH, a copolymer of ethylene and PVOH, starch, CMC and combinations thereof. A copolymer of ethylene and PVOH also is denoted ethylene-vinyl alcohol copolymer (EVOH). Preferably, the water-soluble polymer is selected from the group of PVOH, starch, CMC and combinations thereof.

In embodiments, the barrier layer comprises the water-soluble polymer in an amount in a range of ≥50 weight % to ≤100 weight %, preferably in a range of ≥70 weight % to ≤95 weight %, more preferably in a range of ≥80 weight % to ≤90 weight %, based on the dry weight of the barrier layer.

In embodiments, the water-soluble polymer of the barrier layer is PVOH or a copolymer of ethylene and PVOH. A copolymer of ethylene and PVOH may be preferred, which provides a better moisture resistance. In embodiments wherein the water-soluble polymer is PVOH or a copolymer of ethylene and PVOH, the grammage of the layer or layers preferably is in a range from ≥2 g/m² to ≤7 g/m², or more preferably ≥3 g/m² to ≤7 g/m² or ≥4 g/m² to ≤6 g/m².

In a further embodiment, the water-soluble polymer of the barrier layer is starch. The starch is preferably an amylopectin-rich starch, preferably comprising more than 99% amylopectin. This provides improved film forming. In embodiments wherein the water-soluble polymer is starch, the grammage preferably is in a range from ≥2 g/m² to ≤10 g/m², or preferably in a range from ≥5 g/m² to ≤10 g/m².

In a further embodiment, the water-soluble polymer of the barrier layer is carboxymethylcellulose. In embodiments wherein the water-based polymer is CMC, the grammage of the layer is in a range from ≥4 g/m² to ≤6 g/m².

In embodiments, at least two barrier layers comprising a water-soluble polymer may be applied between the paperboard substrate and the polyolefin layer. Each of the respective barrier layers can be thin to build up a total grammage in accordance with the above given grammages. In this way, the oxygen barrier properties can be further improved.

In an embodiment, the barrier layer or layers comprises an additive selected from the group of maleic acid copolymers and/or acrylic acid copolymers. A preferred styrene maleic acid copolymer is styrene maleic anhydride (SMA). These additives improve the adhesion between the layer of water-soluble polymer and the polyolefin layer even further. The barrier layer may comprise the maleic acid copolymer and/or acrylic acid copolymer in an amount in a range of ≥10 weight % to ≤50 weight %, based on the dry weight of the barrier layer.

In a further embodiment, the barrier layer or layers further comprises pigments, such as a pigment selected from the group of clay, calcium carbonate, talc and/or nanopigments. Preferably, the clay is kaolin clay. The term nanopigments refers to nanoscale powders. Pigments may further improve the barrier properties. The barrier layer may comprise pigments in an amount of less than 50 weight %, based on the dry weight of the barrier layer.

In embodiments, the barrier layer may comprise at least 50 weight %, 80 weight % or 90 weight % of a water-soluble polymer selected from the group of PVOH, copolymer of ethylene and PVOH, starch and/or CMC, in a range from ≥0 weight % to ≤50 weight % of an additive selected from the group of maleic acid copolymers and/or acrylic acid copolymers, and in a range from ≥0 weight % to ≤10 weight % of a second additive such as a de-foamer or a rheology modifier, the weight % based on a total dry weight of 100 weight % of the barrier layer.

In an embodiment, the barrier layer is formed from a foamed water-soluble polymer. In such an embodiment the water-soluble polymer is applied on the paperboard by foam coating. The use of a foamed barrier layer enables a low and/or evenly distributed amount of PVOH, copolymer of ethylene and PVOH, starch and/or CMC in a layer. In case PVOH is used, it is preferred that the degree of hydrolysis is below 88%.

On the print side, the paperboard substrate is provided with at least one dispersion barrier. In one embodiment, the dispersion barrier comprises latex and optionally a pigment. A dispersion barrier comprising latex and pigment applied on the outside of a packaging material may serve as a sufficiently efficient barrier against moisture arising from condensation. In addition, the barrier layer provides optical properties suitable for printing. The latex may be selected from the group comprising styrene-butadiene latex, styrene-acrylate latex, acrylate latex, vinyl-acetate latex, acrylate latex, vinyl acetate latex, vinyl acetate-acrylate latex, styrene-butadiene-acrylonitrile latex, styrene-acrylate-acrylonitrile latex, styrene-butadiene-acrylate-acrylonitrile latex, styrene-maleic anhydride latex, styrene-acrylate-maleic anhydride latex, or mixture of these latexes. The latex is preferably a styrene-butadiene (SB) latex or a styrene-acrylate (SA) latex. The latex can be biobased, i.e. derived from biomass, such as biobased styrene-acrylate or styrene-butadiene latex. Biobased latex can provide similar performance, and provides improved carbon footprint. The pigment in the dispersion layer preferably is selected from the group of clay, talc and calcium carbonate, most preferably clay or calcium carbonate. The clay preferably is kaolin clay.

In these embodiments, the dispersion barrier layer may comprise the latex in an amount in a range of ≥40 weight % to ≤100 weight %, and the pigment in an amount in a range of ≥0 weight % to ≤60 weight %, the percentages being based on a dry weight of the dispersion barrier layer of 100 weight %.

In addition to latex and pigments, the dispersion barrier layer or layers may further comprise a small amount of additives, the amount of additives preferably being in a range of ≥0.1 weight % to ≤5 weight %, or in a range of ≥1 weight % to ≤5 weight %, or in a range of ≥0.1 weight % to ≤1 weight %, as calculated on the dry weight of the dispersion barrier layer. Additives may include thickening agents, defoaming or antifoaming agents, dispersing aids, additional pigments, cross-linkers, slip additives, fillers, release agents, preservatives and antiblocking agents.

In other embodiments, the dispersion barrier layer comprises starch and at least one hydrophobic polymer selected from the group of wax, styrene maleic anhydride (SMA) and/or alkyl ketene dimers (AKDs) or a copolymer of ethylene and polyvinyl alcohol. The copolymer of ethylene and PVOH optionally further includes hydrophobic polymers. The wax may be a polyethylene wax.

The packaging material comprises at least one dispersion barrier layer, preferably more than one dispersion barrier layer, such as two dispersion barrier layers. A first dispersion barrier layer may be applied directly onto the second side of the untreated or surface sized paperboard substrate and a second dispersion barrier layer may be applied on the first dispersion barrier layer. In this embodiment, the second dispersion barrier layer then forms the printing surface. Two dispersion barrier layers may provide better coverage and enhance the barrier properties.

In embodiments, the packaging material exhibits an oxygen transfer rate (OTR) of below 15, preferably below 10 or below 5 $cc/m^2*day*atm$, measured according to ASTM D3985, 23° C., 50% relative humidity (RH); and/or a water vapor transfer rate (WVTR) of below 10 $g/m^2$ per day, or preferably below 5 $g/m^2$, measured according to ASTM F1249; and/or a water absorption rate of below 1 $g/m^2$, as measured using COBB 1800.

Preferably, the OTR may be in a range of ≥1 $cc/m^2*day*atm$ to ≤5 $cc/m^2*day*atm$, more preferably below 3 $cc/m^2*day*atm$. Preferably, the WVTR is below 5 $g/m^2$ per day, more preferred below 3 $g/m^2$ per day, or even below 1 $g/m^2$ per day. The Water absorption rate refers to the degree to which a surface is impervious to liquid and may be measured by surface adsorption, e.g. in $g(water)/m^2$ adsorbed on to a surface in 30 minutes exposure to liquid water. Preferably, the water absorption rate, as measured using COBB1800, is in a range of ≥0.1 to ≤5 $g/m^2$, or even below 1 $g/m^2$.

The packaging material or a packaging comprising or being made from the packaging material may be recycled into other paper products using common repulping technology. In the repulping the cellulose fibers are separated, and after cleaning are recyclable. The unrepulped fraction is referred to as rejects. Rejects can comprise agglomerated fibers and any solid foreign material. Rejects have to be removed for disposal or burning.

In preferred embodiments, the reject received from the repulping of the packaging material is less than 15 weight %, preferably less than 8 weight % more preferably less than 5 weight %, based on a dry weight of the packaging material of 100 weight %. The packaging material thus provides very good repulpability. The packaging material thus may be referred to as a re-pulpable packaging material.

The present invention also relates to a method of manufacturing the packaging material, the method comprising the steps of:
  providing a paperboard substrate comprising a first and a second side,
  applying at least one barrier layer on the first side of the substrate, the barrier layer comprising a water-soluble polymer selected from the group of polyvinyl alcohol (PVOH), a copolymer of ethylene and polyvinyl alcohol, starch, carboxymethylcellulose and combinations thereof in an amount of at least 50 weight %, based on the dry weight of the barrier layer, applying a layer of a polyolefin on the barrier layer, and applying at least one dispersion barrier layer on the second side of the substrate, which at least one dispersion barrier layer forms a printing surface of the packaging material, wherein the layer of polyolefin is applied by extrusion coating using a chill roll, wherein the chill roll temperature is in a range of ≥10° C. to ≤25° C.

Extrusion coating is a continuous process by which a thermoplastic polymer such as a polyolefin is melted and extruded through a flat die onto a chill roll. The chill roll primarily acts as a heat transfer and finishing device in the extrusion and coating operations. Without wishing to be bound to any theory, it is assumed that a specific chill roll temperature is important for the forming of a trans-crystalline structure forming at the interface between the polyolefin layer and the water-soluble polymer layer.

In the process of of manufacturing the packaging material, the extrusion of the polymer layer preferably is further performed at a specific melt temperature which has the polymer when leaving the extruder. In embodiments of the method, the extrusion of a polyethylene layer is performed at a melt temperature in a range of ≥300° C. to ≤330° C. and/or the extrusion of a polypropylene layer is performed at a melt temperature in a range of ≥295° C. to ≤320° C. In embodiments where PE is used for the polyolefin layer, the melt temperature preferably is in a range of ≥310° C. to ≤325° C. and the chill roll temperature is preferably in a range of ≥10° C. to ≤25° C. In embodiments where PP is used for the polyolefin layer, the melt temperature preferably is in a range of ≥300° C. to ≤315° C. and the chill roll temperature is preferably in a range of ≥10° C. to ≤25° C.

In embodiments, the paperboard substrate applied with the barrier layer is treated by corona treatment or flame treatment before being extrusion coated with the layer of polyolefin. In further embodiments of the method, the extrusion coated layer of polyolefin is ozone treated at the extrusion step. The ozone treatment at the extrusion step can be performed in addition or alternatively to the corona or flame treatment. The paperboard substrate applied with the barrier layer of starch, CMC or PVOH can preferably be treated by corona treatment before being extrusion coated with the layer. It is assumed that by these treatments the polymers are partly broken down, resulting in an increased mobility which facilitates the crystallization in the interface between the water-soluble polymer and the polyolefin layer.

The water-based polymer can be applied by any known coating method including e.g. roller coating, curtain, blade coating, rod coating, jet coating etc. In one preferred embodiment the barrier layer or layers comprising the water based polymer is applied on-line in the paperboard machine.

The barrier layer can be applied as a foam. In such an embodiment the water-soluble polymer is applied on the paperboard by foam coating. This enables low amount of PVOH, starch and/or CMC to be applied and yet an even distribution to be achieved. In case PVOH is used for the barrier layer, it is preferred that the degree of hydrolysis is below 88%. Foam application further facilitates the use of a mixture of PVOH and e.g. starch or CMC.

The dispersion barrier layer preferably is applied by the use of roller coating, spray coating, curtain, blade coating, slot coating, immersion coating, gravure roll coating, reverse direct gravure coating, rod coating, soft-tip blade coating and/or combinations thereof. A preferred coating method involves the use of a rod coater or a soft-tip blade coater.

The invention further relates to a packaging comprising or being made from the packaging material as described above. The packaging is particularly usable for liquid and/or frozen food. The packaging is preferably made by use of heat-sealing.

Preferably, the packaging does not comprise aluminum, such as a layer or foil of aluminum. Further preferred, the packaging does not include a polyolefin layer on the second, outside/print side of the packaging. Preferably, the packaging does only include one polyolefin layer. Since the amount of extruded polyolefin can be considerably diminished compared to known packagings, re-pulpability and the separation of the polyolefin layer in the recycling is much facilitated. In embodiments, the reject in the repulping of the packaging is less than 15 weight %, preferably less than 8 weight % more preferably less than 5 weight %, based on a dry weight of 100 weight % of the packaging.

Further features of the present invention will become apparent from the examples and figures, wherein.

Figure 1:
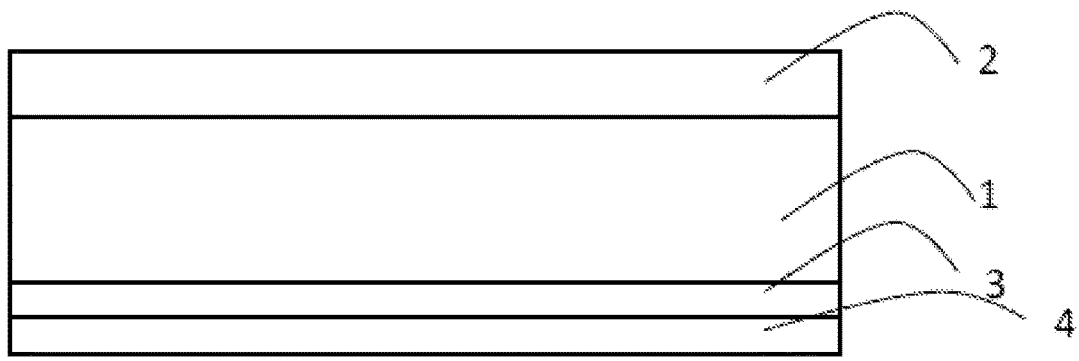
FIG. 1 is a schematic drawing of a packaging material according to an embodiment of the invention.

The packaging material shown in FIG. 1 comprises a paperboard substrate 1. The paperboard substrate 1 has a first and a second side, wherein on the first side of the paperboard is coated with a barrier layer 3, wherein the barrier layer 3 comprises a water-soluble polymer selected from the group of PVOH, a copolymer of ethylene and PVOH, starch, carboxymethylcellulose and combinations thereof in an amount of at least 50 weight %, based on the dry weight of the barrier layer 3. A layer of polyolefin 4, such as of polyethylene or polypropylene, is extrusion coated on the barrier layer 3. The extrusion coated layer 4 will be in contact with the content of a packaging formed from the packaging material. The second side of the paperboard substrate 1 is coated with a dispersion barrier layer 4, wherein the dispersion barrier layer 4 forms the printing surface of the packaging material. The paperboard as shown in FIG. 1 is particularly suitable for heat-sealed packages for liquid and/or frozen food.

Figure 2:
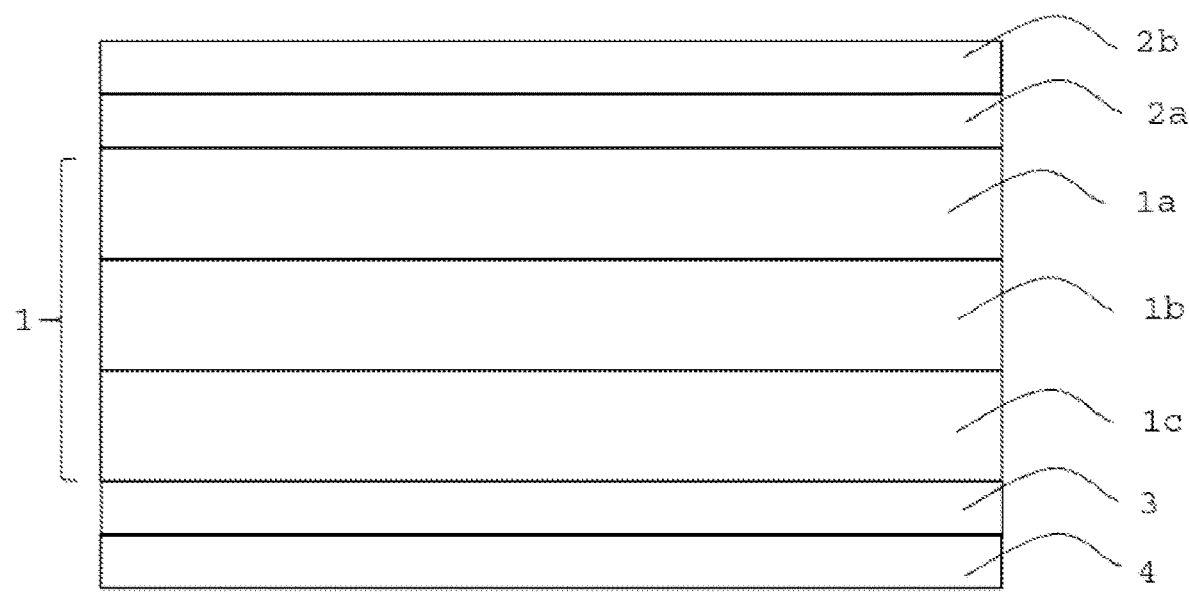
FIG. 2 is a schematic drawing of a packaging material according to a further embodiment of the invention.

The packaging material shown in FIG. 2 comprises a paperboard substrate 1, comprising three plies, a top ply 1a, a middle ply 1b and a back ply 1c. The middle layer 1b contains CTMP and sulphate/kraft pulp in order to give bulk. The pulp can be unbleached or bleached. The surface layer of the board 1a and 1c can contain surface sizer. On the second of side paperboard substrate, the top ply 1a is coated with a first dispersion barrier layer 2a, and a second dispersion barrier layer 2b is arranged on the first barrier layer 2a. The dispersion barrier layers are brought by dispersion barrier coating onto the paperboard substrate. The packaging material may be printed directly on the outermost dispersion barrier layer 2b. On the first side, the back ply 1c of the paperboard substrate is coated with a barrier layer 3, wherein the barrier layer 3 comprises a water-soluble polymer selected from the group of PVOH, a copolymer of ethylene and PVOH, starch, carboxymethylcellulose and combinations thereof in an amount of at least 50 weight %, based on the dry weight of the barrier layer 3. A layer of polyolefin 4, such as of polyethylene or polypropylene, is extrusion coated on the barrier layer 3. The extrusion coated layer 4 will be in contact with the content of a packaging formed from the packaging material.

EXAMPLE 1

In order to evaluate the barrier properties of the packaging material of the invention, a test series was performed in which the barrier properties of packaging material manufactured in accordance with the invention was evaluated in a pilot trial using jet and rod coating.

The paperboard substrate used in the test series was a baseboard of grammages between 190-232 gsm, which is a multi-layer paperboard with two outer layers made of bleached kraft pulps and a middle layer comprising bleached kraft pulp and CTMP.

The paperboard substrates were coated with polyvinyl alcohol (PVOH) or starch forming a barrier layer on the reverse side, i.e. the side to form the inside of the thereof made package. The starch was a potato starch comprising at least 99 wt % of amylopectin. Thereafter the coated substrates were extrusion coated with polyethylene (PE) or polypropylene (PP) forming an extrusion coated layer. The extrusion coating was performed at a polymer melt temperature of around 300° C., further using a chill roll held at a temperature of 15-20° C. All samples were corona treated before the extrusion coating step.

The samples were thus prepared to show the following coating structure:

Baseboard/Barrier layer/Extrusion coated layer

As a reference, a baseboard was extrusion coated with polyethylene without being pre-coated with a barrier layer (REF).

Table 1 shows the grammage of the baseboard and the type and amount of applied barrier layer and extrusion coated layer.

TABLE 1

| Test Point | Baseboard grammage [g/m$^2$] | Barrier layer | Barrier layer grammage [g/m$^2$] | Extrusion coated layer | Ext. coated layer grammage [g/m$^2$] |
|---|---|---|---|---|---|
| 1 | 232 | PVOH | 4.6 | PE | 35 |
| 2 | 232 | Starch | 6.7 | PE | 35 |
| 3 | 190 | Starch | 8 | PP | 20 |
| 4 | 190 | PVOH | 5 | PP | 20 |
| 5 | 232 | PVOH | 4.5 | PE | 35 |
| 6 | 225 | Starch | 2.8 | PE | 15 |
| 7 | 225 | Starch | 2.8 | PP | 20 |
| 8 | 232 | PVOH | 6.3 | PE | 15 |
| 9 | 232 | PVOH | 6.3 | PP | 20 |
| REF | 232 | — | — | PE | 35 |

The properties of the packaging material of the invention are summarized in table 2. WVTR and COBB1800 were only determined for some of the test points.

As can be seen in table 2, the packaging materials of the invention showed excellent barrier properties.

All the samples were thereafter converted into packages whereupon the barrier properties were measured. The OTR, WVTR and COBB1800 of the converted packages did not differ significantly from those of the packaging material samples.

TABLE 2

| Test point | OTR [cc/m$^2$ * day * atm] | WVTR [g/m$^2$] | COBB1800 [g/m$^2$] |
|---|---|---|---|
| 1 | 3 | 1.8 | |
| 2 | 8 | 2.3 | |
| 3 | 13.8 | 2.1 | 0.5 |
| 4 | 2.8 | 1.7 | 0.2 |
| 5 | 0.8 | 2 | |
| 6 | 16 | | |
| 7 | 13 | | |
| 8 | 3.4 | 3.8 | |
| 9 | 1.6 | 2.3 | |
| REF | 840 | 2 | |

The invention claimed is:

1. A packaging material comprising:
    a paperboard substrate comprising a first and a second side,
    at least one barrier layer applied on the first side of the substrate, the barrier layer comprising a water-soluble polymer selected from a group consisting of polyvinyl alcohol, a copolymer of ethylene and polyvinyl alcohol, starch, carboxymethylcellulose, and combinations thereof in an amount of at least 50 weight %, based on a dry weight of the at least one barrier layer,
    an extrusion coated layer of a polyolefin on the at least one barrier layer, and
    at least one dispersion barrier layer applied on the second side of the substrate, wherein the at least one dispersion barrier layer forms a printing surface of the packaging material.

2. The packaging material according to claim 1, wherein the polyolefin of the extrusion coated layer is selected from a group consisting of polyethylene and polypropylene.

3. The packaging material according to claim 1, wherein the at least one barrier layer comprises the water-soluble polymer in an amount in a range of ≥50 weight % to ≤100 weight %, based on the dry weight of the at least one barrier layer.

4. The packaging material according to claim 1, wherein the water-soluble polymer of the at least one barrier layer is polyvinyl alcohol or a copolymer of ethylene and polyvinyl alcohol, and a grammage is in a range from ≥2 g/m$^2$ to ≤7 g/m$^2$.

5. The packaging material according to claim 1, wherein the water-soluble polymer of the at least one barrier layer is starch, and a grammage is in a range from ≥2 g/m$^2$ to ≤10 g/m$^2$.

6. The packaging material according to claim 1, wherein the water-soluble polymer of the at least one barrier layer is carboxymethylcellulose, and a grammage is in a range from ≥4 g/m$^2$ to ≤6 g/m$^2$.

7. The packaging material according to claim 1, wherein the at least one dispersion barrier layer comprises latex in an amount in a range of ≥40 weight % to ≤100 weight %, and a pigment in an amount in a range of ≥0 weight % to ≤60 weight %, the percentages being based on a dry weight of the at least one dispersion barrier layer of 100 weight %.

8. The packaging material according to claim 1, wherein the at least one dispersion barrier layer comprises starch and at least one hydrophobic polymer selected from a group consisting of: wax, styrene maleic anhydride (SMA), alkyl ketene dimers (AKDs), and a copolymer of ethylene and polyvinyl alcohol.

9. The packaging material according to claim 1, wherein the packaging material exhibits an oxygen transfer rate (OTR) below 5 cc/m$^2$*day*atm, measured according to ASTM D3985, 23° C., 50% relative humidity (RH); or a water vapor transfer rate (WVTR) of below 10 g/m$^2$ per day, measured according to ASTM F1249; or a water absorption rate of below 1 g/m$^2$, as measured using COBB 1800, or any combination of the foregoing.

10. The packaging material according to claim 1, wherein reject received from a repulping of the packaging material is less than 15 weight %, based on a dry weight of the packaging material of 100 weight %.

11. A method of manufacturing the packaging material according to any claim 1, the method comprising the steps of:
providing the paperboard substrate comprising the first and the second side,
applying the at least one barrier layer on the first side of the substrate,
applying the layer of the polyolefin on the barrier layer, and
applying the at least one dispersion barrier layer on the second side of the substrate,
wherein the layer of polyolefin is applied by extrusion coating using a chill roll, wherein a chill roll temperature is in a range of ≥10° C. to ≤25° C.

12. The method according to claim 11, wherein the polyolefin is selected from a group consisting of polyethylene and polypropylene, and wherein a extrusion of the polyethylene is performed at a melt temperature in a range of ≥300° C. to ≤330° C., or an extrusion of the polypropylene is performed at a melt temperature in a range of ≥295° C. to ≤320° C.

13. The method according to claim 11, further comprising:
treating the paperboard substrate by corona treatment or flame treatment before being extrusion coated with the layer of polyolefin.

14. The method according to claim 11, further comprising:
ozone treating the layer of polyolefin at the extrusion step.

15. A packaging comprising or being made from the packaging material according to claim 1.

* * * * *